United States Patent
Nagai et al.

(10) Patent No.: US 8,202,482 B2
(45) Date of Patent: Jun. 19, 2012

(54) APPARATUS FOR REMOVING OF TRACE OF TOXIC SUBSTANCE FROM EXHAUST GAS AND METHOD OF OPERATING THE SAME

(75) Inventors: Yoshinori Nagai, Hiroshima (JP); Toshio Katsube, Hiroshima (JP); Isato Morita, Hiroshima (JP); Hirofumi Kikkawa, Hiroshima (JP); Yasuyoshi Kato, Hiroshima (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 722 days.

(21) Appl. No.: 12/373,817

(22) PCT Filed: Jul. 26, 2006

(86) PCT No.: PCT/JP2006/314744
§ 371 (c)(1),
(2), (4) Date: Jan. 14, 2009

(87) PCT Pub. No.: WO2008/012878
PCT Pub. Date: Jan. 31, 2008

(65) Prior Publication Data
US 2010/0000410 A1 Jan. 7, 2010

(51) Int. Cl.
*B01D 46/02* (2006.01)
(52) U.S. Cl. .................................. 422/173; 422/177
(58) Field of Classification Search .............. 422/173, 422/177; 423/210
See application file for complete search history.

(56) References Cited

U.S. PATENT DOCUMENTS

| | | | | |
|---|---|---|---|---|
| 4,940,567 A | * | 7/1990 | Ohlmeyer et al. | 422/173 |
| 5,409,522 A | * | 4/1995 | Durham et al. | 75/670 |
| 6,699,440 B1 | * | 3/2004 | Vermeulen | 422/177 |
| 7,507,381 B2 | * | 3/2009 | Muramoto et al. | 422/173 |
| 7,651,329 B2 | | 1/2010 | Okura et al. | |
| 7,691,349 B2 | * | 4/2010 | Muramoto et al. | 423/210 |

(Continued)

FOREIGN PATENT DOCUMENTS

JP 50-128681 3/1974

(Continued)

OTHER PUBLICATIONS

Japanese Office Action that issued with respect to Japanese Patent Application No. 2006-285761, mailed Sep. 1, 2010, along with an English language translation thereof.

(Continued)

*Primary Examiner* — Nina Bhat
(74) *Attorney, Agent, or Firm* — Greenblum & Bernstein, P.L.C.

(57) ABSTRACT

An apparatus for removing of traces of toxic substances from exhaust gas, comprising, disposed in sequence from the upstream side in a flow channel of exhaust gas emitted from combustion equipment, a denitration unit including a denitration catalyst layer capable of removing nitrogen oxides from the exhaust gas and capable of oxidizing metallic mercury; an air preheater adapted for heat exchange between air for combustion in the combustion equipment and the exhaust gas; a dust removal unit having a bag filter containing a catalyst for metallic mercury oxidation; and a desulfurization unit for removing sulfur oxide from the exhaust gas. The bag filter may be disposed in advance of the desulfurization unit. Thus, there can be provided an apparatus for removing of traces of toxic substances from exhaust gas that is stable over a prolonged period of time and is highly reliable; and provided a method of operating the same.

12 Claims, 4 Drawing Sheets

U.S. PATENT DOCUMENTS

| | | |
|---|---|---|
| 7,722,844 B2 * | 5/2010 | Nakagawa et al. ......... 423/239.1 |
| 7,731,926 B2 | 6/2010 | Oda et al. |
| 7,833,501 B2 | 11/2010 | Kobayashi et al. |
| 2003/0170159 A1 * | 9/2003 | Honjo et al. .................. 423/210 |
| 2004/0253158 A1 | 12/2004 | Honjo et al. |
| 2009/0173234 A1 | 7/2009 | Ueda et al. |
| 2009/0277334 A1 | 11/2009 | Oda et al. |
| 2009/0320687 A1 | 12/2009 | Ueda et al. |
| 2010/0071348 A1 | 3/2010 | Kobayashi et al. |
| 2010/0077925 A1 | 4/2010 | Konishi et al. |
| 2010/0116126 A1 | 5/2010 | Shimamura et al. |

FOREIGN PATENT DOCUMENTS

| | | |
|---|---|---|
| JP | 61-004575 | 1/1986 |
| JP | 62-247826 | 10/1987 |
| JP | 02-253828 | 10/1990 |
| JP | 07-328378 | 12/1995 |
| JP | 8-196830 | 8/1996 |
| JP | 08-196830 | 8/1996 |
| JP | 10-66814 | 3/1998 |
| JP | 11-342332 | 12/1999 |
| JP | 2000-262854 | 9/2000 |
| JP | 2001-104728 | 4/2001 |
| JP | 2003-24799 | 1/2003 |
| JP | 2003-053142 | 2/2003 |
| JP | 2003-53142 | 2/2003 |
| JP | 2004-23724 | 8/2004 |
| JP | 2004-237244 | 8/2004 |
| JP | 2005-023859 | 1/2005 |
| JP | 2006-26525 | 2/2006 |
| JP | 2006-026525 | 2/2006 |
| JP | 2006-029673 | 2/2006 |
| JP | 2006-205128 | 8/2006 |

OTHER PUBLICATIONS

English language abstract thereof JP 8-196830.
English language abstract thereof JP 2006-26525.
English language abstract thereof JP 2003-24799.
English language abstract thereof JP 2006-205128.
English language abstract thereof JP 50-128681.
English language abstract thereof JP 2003-53142.
English language abstract thereof JP 10-66814.

* cited by examiner

APPARATUS FOR REMOVING OF TRACE OF TOXIC SUBSTANCE FROM EXHAUST GAS AND METHOD OF OPERATING THE SAME

BACKGROUND OF THE INVENTION

1. Technical Field

The present invention relates to an apparatus for removing trace amounts of toxic substances contained in exhaust gas resulting from the combustion of petroleum or coal, in particular, metallic mercury compounds, and a method of operating the same. Specifically, it relates to an apparatus for removing trace amounts of toxic substances from exhaust gas which is capable of removing metallic mercury compounds stably and efficiently after a prolonged operation thereof and a method of operating the same.

2. Background Art

Exhaust gas from combustion equipment such as a boiler using petroleum or coal etc., contains not only nitrogen oxides (NOx) and sulfur oxides (SOx) which are causative substances of photo-chemical smog and acid rain but also compounds of heavy metals such as metallic mercury as trace amounts of toxic substances. As an efficient method of removing NOx, a method of denitration of exhaust gas in which reducing agents such as ammonia (NH$_3$) are used to effect selective catalystic reduction has been widely adopted mainly at thermal power plants. Mainly used catalysts are those in which vanadium (V), molybdenum (Mo) and tungsten (W) are used as active compositions and titanium oxide (TiO$_2$) is used as a carrier. In particular, those in which vanadium is contained as one of active compositions have now been mainly used as denitration catalysts due to the fact that they are not only high in activity but also less likely to be deteriorated by impurities contained in exhaust gas and can be used at lower temperatures (Japanese Published Unexamined Patent Application No. S50-128681 and others). Further, the catalyst compositions are ordinarily formed and used in a honey-comb shape or a plate-shape structure, and methods for manufacturing them have been invented for various types.

On the other hand, regarding the removal of SOx contained in exhaust gas from the combustion equipment, a wet desulfurization unit in which limestone slurry is used to absorb and remove SOx in the exhaust gas is able to attain a highly efficient desulfurization. Therefore, this desulfurization unit has been mainly used for desulfurization. Independent of this unit, there has been proposed a semidry desulfurization unit in which lime or magnesium hydroxide (Mg(OH)$_2$) is used as an absorbent. A desulfurization method using the semidry desulfurization unit is a method in which an absorbent such as limestone is directly sprayed into exhaust gas inside a flow channel of exhaust gas on the upstream side of a dust removal unit and retained inside the flow channel of exhaust gas or the dust removal equipment for a predetermined period of time after the spraying, thereby removing SOx from the exhaust gas. This method is advantageous in that it is economical because of the lower cost of the equipment, although not suitable for attaining a highly efficient desulfurization.

Meanwhile, over the last few years, studies have been actively conducted for reducing the exhaust of metallic mercury compounds in exhaust gas resulting from the combustion of petroleum or coal. The metallic mercury compounds are to seriously affect humans through the food chain once they are emitted into the atmosphere. Regarding trace amounts of toxic substances such as metallic mercury resulting from the combustion of petroleum or coal, compositions evaporated by the combustion are moved into exhaust gas. In most cases, metallic mercury is said to be exhausted as gaseous metallic mercury at a combustion zone in the vicinity of 1,500° C. It has been confirmed that metallic mercury is partially oxidized by concurrent hydrogen chloride (HCl) to give mercury chloride (HgCl$_2$) in a relatively low temperature region (from 300 to 450° C.) of a flow channel of exhaust gas as shown by the following formula (1). It is also known that the reaction is facilitated on a denitration catalyst set in a temperature range of approximately 300° C. to 450° C. Further, it is known that the reaction proceeds substantially completely in the rightward direction at a temperature lower than 300° C. and metallic mercury is oxidized to mercury chloride.

$$Hg + HCl + 1/2O_2 = HgCl_2 + H_2O \tag{1}$$

Mercury chloride (HgCl$_2$) generated in the above reaction formula (1) is lower in steam pressure than metallic mercury, absorbed on dust and removed by a dust removal unit disposed on the downstream side of the flow channel of exhaust gas. Further, it is known that since mercury chloride (HgCl$_2$) is easily absorbed by water, it is absorbed by an absorption liquid such as limestone slurry in a wet desulfurization unit or absorbed and removed by a spray absorbent in a semidry desulfurization unit.

However, there are fears that metallic mercury kept unoxidized may be exhausted mostly from smoke stacks in a gaseous state (metallic mercury vapor) as it is.

Thus, as technologies for decreasing an exhausted amount of metallic mercury, there have been proposed several methods: that is, a method (conventional technology 1) in which activated carbon is sprayed into a flow channel of exhaust gas on the upstream side of dust removal equipment disposed at a low temperature region to remove metallic mercury effectively by the absorption effect and catalyst effect of the activated carbon; a method (conventional technology 2) in which, as shown in the invention described in Japanese Published Unexamined Patent Application No. 2003-53142, a solid oxidation catalyst layer is disposed in a low temperature region (300° C. or lower) on the downstream side of a heat exchanger in a flow channel of exhaust gas where a denitration catalyst, an air preheater, a dust removal unit and the heat exchanger are disposed in sequence from the upstream side, thereby oxidizing metallic mercury and then absorbing and removing the metallic mercury by an absorbing liquid in a wet desulfurization unit; and a method (Japanese Published Unexamined Patent Application No. H10-66814, conventional technology 3) using an exhaust gas-treating bag filter in which a metallic mercury-absorbing agent is retained on a filter cloth for removing toxic substances contained in exhaust gas.

Patent Document 1: Japanese Published Unexamined Patent Application No. 2003-53142
Patent Document 2: Japanese Published Unexamined Patent Application No. H10-66814

DISCLOSURE OF THE INVENTION

Problems to be Solved by the Invention

The above-described conventional technologies (1 to 3) have the following problems. Specifically, the conventional technology 1 is enormous in the amount of gas to be treated when used for combustion equipment in large-scale power generation facilities, thus resulting in an extremely great amount of activated carbon to be used. Thus, it is not only uneconomical but also practically difficult to use continuously activated carbon. There is also a problem that a great amount of activated carbon is contained in dust which has been recovered by a dust removal unit and it is difficult to treat the dust.

Further, the conventional technology 2 is a method in which attention is given to the fact that the catalyst reaction shown in the above formula (1) proceeds more effectively at low temperatures. However, an oxidation catalyst layer needs to be newly added to an existing exhaust-gas treating system. Therefore, since a space is needed for disposing the oxidation catalyst layer, it is disadvantageous in terms of cost in coping with the problem by using the existing exhaust-gas treating system. Further, the newly disposed oxidation catalyst layer would result in a great increase in ventilation resistance inside a flow channel of exhaust gas, which would additionally require the installation of induced draft fans etc., in the flow channel of exhaust gas. Where a great amount of SOx is present in exhaust gas, as shown in FIG. 3, such a problem is posed that a low-temperature oxidation catalyst is greatly deteriorated with the lapse of time and not stable if stored for a prolonged period of time.

Still further, the conventional technology 3 is a method of retaining a metallic mercury adsorbent on a filter cloth. Since the adsorbent is decreased in adsorption capacity with the lapse of use time to result in a saturated adsorption amount where metallic mercury is adsorbed and treated, the adsorbent must be exchanged within a shorter period of time. Therefore, this method is not only uneconomical but also huge in cost for discarding the filter cloth which has adsorbed a great amount of metallic mercury compounds.

An object of the present invention is to provide an apparatus for removing trace amounts of toxic substances from exhaust gas which is stable over a prolonged period of time and is highly reliable by solving the problems of the above conventional technologies and a method of operating the same.

Means for Solving the Problems

In accordance with one aspect of the invention, there is provided an apparatus for removing trace amounts of toxic substances from exhaust gas in which an air preheater (6) adapted for heat exchange between air for combustion in combustion equipment and the exhaust gas and a dust removal unit (7) having a bag filter provided with a filter cloth carrying an oxidation catalyst for metallic mercury are disposed in sequence from the upstream side in a flow channel of exhaust gas emitted from the combustion equipment for burning petroleum or coal.

A metallic mercury composition contained in exhaust gas emitted from combustion equipment (4) such as a boiler which uses petroleum or coal as a fuel is metallic mercury resulting from the decomposition of metallic mercury compounds in the fuel during the combustion process of the fuel at high temperatures of around 1500° C. Metallic mercury in the exhaust gas is present substantially as metallic mercury vapors, although depending on the properties of the fuel. The exhaust gas is lowered in temperature while clarified in a flow channel of exhaust gas, and metallic mercury vapors emitted from the combustion equipment (4) such as a boiler are oxidized by concurrent hydrogen chloride (HCl) in the exhaust gas, as shown in the formula (1) during the process of the lowering in temperature, and partially changed to mercury chloride ($HgCl_2$).

This reaction proceeds in the rightward direction of the reaction formula (1) more easily as the temperature is lower due to a thermodynamic equilibrium, and is greatly influenced by the retention time of metallic mercury vapors in an atmosphere of 60 to 400° C. Further, it is known that the reaction is facilitated by a denitration catalyst of a denitration unit (5) which is one constituent of an exhaust-gas treating system used at a temperature condition of 300 to 400° C. and particularly facilitated where the concentration of HCl in exhaust gas is high. Thus, metallic mercury compounds oxidized by the denitration catalyst and converted to $HgCl_2$ or others are adsorbed on the surface of dust inside the dust removal unit (7) which is one constituent of an exhaust-gas treating system disposed on the downstream side of the denitration unit (5) in a flow channel of exhaust gas due to the characteristics and also easily absorbed by an absorbent such as lime slurry by desulfurization units (8a, 8b). Therefore, an exhaust-gas treating system in which the denitration catalyst inside the denitration unit (5) is used to oxidize metallic mercury and remove the thus oxidized metallic mercury compounds obtained by the constituents on the downstream side of the denitration unit (5) is effective means for removing the metallic mercury compounds in the exhaust gas.

However, the efficient means can be provided even if only a bag filter carrying a catalyst is disposed in a flow channel of exhaust gas of the combustion equipment without the denitration unit (5) which uses a denitration catalyst in existing facilities.

According to the invention described in claim 1, the bag filter in itself is given functions capable of oxidizing metallic mercury, and the metallic mercury is oxidized on the bag filter, by which compounds converted to mercury chloride or others are easily adsorbed on dust particles. Further, since non-woven cloth is used as a filter cloth, gas flow is not simple (streamline flow) as compared with an ordinary solid oxidation catalyst, that is, the flow is disrupted. Therefore, even when low concentrations of HCl and metallic mercury are used, HCl and metallic mercury are high in contact efficiency, by which it can be expected that metallic mercury undergoes a highly efficient oxidation reaction.

As described so far, in accordance with one aspect of the invention, the dust removal unit (7) having a bag filter carrying an oxidation catalyst for metallic mercury is structurally adapted for oxidizing the low concentration of metallic mercury in exhaust gas relatively lowered in temperature through heat exchange by the air preheater (6) at a high contact efficiency.

Even where the denitration unit (5) is disposed on the upstream side and a leakage amount of NH3 is greatly increased due to deterioration of the denitration unit (5) with the lapse of time, etc., the dust removal unit (7) having a bag filter carrying the oxidation catalyst in accordance with one aspect of the invention is able to facilitate the deposition of fine-pore blocking substances such as acid ammonium sulfate in which a cake layer of dust formed on the surface of a filter cloth of the bag filter is deposited at a low temperature to suppress the deterioration of an oxidation catalyst for metallic mercury contained in the filter cloth. Therefore, it is possible to operate the unit stably over a prolonged period of time (acid ammonium sulfate is deposited on the cake layer of dust formed on the surface of the filter cloth of the bag filter, and ammonium sulfate will not arrive at the filter cloth on which the oxidation catalyst is attached, thereby fine pores of the filter cloth will not be blocked with ammonium sulfate).

It is noted that in the conventional technology 3, metallic mercury adsorbed on the filter cloth is in a state of metal, and the filter cloth is decreased in adsorption capacity with an increase in use time of the filter cloth. However, in accordance with one aspect of the present invention, metallic mercury is converted to mercury chloride and others by an oxidation catalyst carried on the bag filter, and the mercury chloride and others are detached easily from the filter cloth. Thus, there is no chance that the filter cloth is blocked.

Therefore, according to one aspect of the invention, trace amounts of toxic substances contained in exhaust gas emitted from the combustion equipment (4) which burns petroleum or coal can be subjected to oxidation and decomposition stably over a prolonged period of time, thereby removing and treating efficiently.

The invention in accordance with another (second) aspect of the invention includes the apparatus for removing trace amounts of toxic substances from exhaust gas described in claim 1 in which a denitration unit (5) including a denitration catalyst layer having functions capable of removing nitrogen oxides from the exhaust gas and capable of oxidizing metallic mercury is disposed in a flow channel of exhaust gas on the upstream side of the air preheater (6), and a wet desulfurization unit (8*a*) for spraying an absorbent slurry (an absorbing liquid such as limestone slurry is used) into the flow channel of exhaust gas on the downstream side of the dust removal unit (7) to remove sulfur oxides from the exhaust gas is disposed.

In accordance with another (third) aspect, the invention provides an apparatus for removing trace amounts of toxic substances from exhaust gas described in claim 1 in which the denitration unit (5) including a denitration catalyst layer having functions capable of removing nitrogen oxides from the exhaust gas and capable of oxidizing metallic mercury is disposed in a flow channel of exhaust gas on the upstream side of the air preheater (6), and a semidry desulfurization unit (8*b*) for spraying an absorbent slurry (calcium hydroxide or magnesium hydroxide etc., is used) into the flow channel of exhaust gas to remove sulfur oxides from the exhaust gas is disposed in the flow channel of exhaust gas between the air preheater (6) and the dust removal unit (7).

It is noted that the apparatus for removing trace amounts of toxic substances in accordance with the aspect, as described above may be additionally provided with the wet desulfurization unit on the downstream side of the semidry desulfurization unit (8*b*).

Incidentally, in the U.S. and others, there are now used mainly two types of coal. They are EB (Eastern Bituminous) coal and PRB (Powder Rover Basin) coal. In particular, since PRB coal is abundant in reserves and low in price, the coal is expected to be used in an increased amount continuously. These types of coal have the following characteristics.

EB coal is characterized in that high concentrations of SOx and HCl are contained in exhaust gas resulting from combustion of the coal because of sulfur and chlorine contained at high concentrations. Further, PRB coal is characterized in that substances derived from the coal easily attach on the wall of a boiler due to a high concentration of ash, although chlorine is contained at extreme low concentrations.

Therefore, the technology for treating exhaust gas resulting from combustion of these types of coal is in general carried out as according to the following procedures.

EB coal; exhaust gas→denitration→heat exchange→dust removal→wet desulfurization (high efficiency desulfurization)→smokestack (a)

PRB coal; exhaust gas→denitration→heat exchange→semidry desulfurization (simple desulfurization)→dust removal→smokestack (b)

In the above process (b), there is a case where a wet desulfurization step is additionally incorporated on the downstream side of the dust removal step. Further, the above process (a) corresponds to a second aspect of the invention described above, and the process (b) corresponds to a third aspect of the invention described above.

Regarding the removal of metallic mercury in exhaust gas from the boiler, in the process (a), an oxidation catalyst contained in a denitration catalyst in the denitration step is used to recover the metallic mercury as mercury chloride relatively easily due to the presence of HCl at high concentration in the exhaust gas. However, in the process (b), since the concentration of HCl is low in exhaust gas, it is difficult to cause the oxidation reaction by the oxidation catalyst in the denitration step. Particularly in the process (b), the greatest technical concern is how to remove metallic mercury effectively.

In the second and third aspects of the invention, metallic mercury in exhaust gas will be removed as follows.

Metallic mercury is removed by being oxidized and converted to mercury chloride and by allowing hydrogen chloride to be adsorbed on dust particles. In the process (a) corresponding to claim 2, as described above, since the concentration of HCl in exhaust gas is relatively high and the temperature condition is also matched, the reaction in the rightward direction of the reaction formula (1) is facilitated inside the denitration unit (5), thereby oxidation products of metallic mercury are obtained more abundantly than in the process (b). Then, unreacted metallic mercury is subjected to oxidation by a bag filter carrying an oxidation catalyst for metallic mercury, some of which is adsorbed and removed by the bag filter. Further, the oxidation products of metallic mercury flowing from the bag filter to the downstream side of the flow channel of exhaust gas is removed by a method in which they are absorbed by an absorption liquid inside the wet desulfurization unit (8*a*).

In other words, in the process (a), exhaust gas prior to passage through the wet desulfurization unit (8*a*) is allowed to be treated by the denitration unit (5) and the dust removal unit (7), by which the high concentration of HCl in the exhaust gas can be effectively utilized to effect the oxidation to mercury chloride. Therefore, HCl is not consumed by the wet desulfurization unit (8*a*).

Further, in the process (b) corresponding to a third aspect of the invention as discussed above, since the concentration of HCl in exhaust gas is relatively low, metallic mercury is not oxidized inside the denitration unit (5) to such an extent that is found in the process (a). However, the metallic mercury is oxidized by an oxidation catalyst on the bag filter of the dust removal unit (7) located at a relatively low temperature region and converted to mercury compositions such as mercury chloride. Then these compositions can be recovered and removed from the dust removal unit (7).

In the process (b), the exhaust gas is lowered in temperature by the air preheater (6) disposed in a flow channel of exhaust gas on the downstream side of the denitration unit (5), by which the reaction given by the reaction formula (1) easily proceeds in the rightward direction by an oxidation catalyst carried on a bag filter located in a region the temperature of which is lower than a reaction temperature at the denitration unit (5). Thereby, the metallic mercury is able to undergo the oxidation reaction and easily oxidized effectively even at a low concentration of HCl.

In other words, in the process (b), even where the concentration of HCl in exhaust gas is relatively low, the oxidation catalyst allows metallic mercury to undergo oxidation (Hg+ $1/2O_2$=HgO) due to oxygen, in addition to chlorine on the bag filter of the dust removal unit (7). And, the metallic mercury can be efficiently converted to mercury chloride by the bag filter carrying the oxidation catalyst in a low temperature region, although it is not sufficiently changed to mercury chloride ($HgCl_2$) on a denitration catalyst layer of the denitration unit (5) (HgO+2HCl=$HgCl_2$+$H_2O$).

Oxidation products of metallic mercury such as mercury chloride recovered together with the processes (a) and (b) are moved to a water tank and subjected to clarification treatment.

In the process (b), a slurry-state absorbent in the step of semidry desulfurization is sprayed into exhaust gas, dried up and recovered by the dust removal unit (7). Since the absorbent must be removed together with dust, it is impossible to change the order of "semidry desulfurization→dust removal." In the process (b), even in the step of semidry desulfurization, a certain amount of mercury compositions such as mercury chloride resulting from the oxidation of metallic mercury inside the denitration unit (5) on the relatively upstream side can be removed. However, the removal is not sufficient. Further, some of HCl (HCl has properties to facilitate the oxidation by an oxidation catalyst for metallic mercury) in exhaust gas is also removed in the step of semidry desulfurization. Therefore, a bag filter disposed in the step of dust removal set in a low temperature region preferable in terms of equilibrium is allowed to carry an oxidation catalyst, thereby effecting at the same time the oxidation of metallic mercury and adsorption of the mercury chloride on dust collected by a filter cloth. Further, since non-woven cloth is used as the filter cloth, gas flow is not a simple streamline flow as compared with an ordinary solid oxidation catalyst, or the gas flow is disrupted when exhaust gas passes through the filter cloth. Therefore, the low concentration of HCl in the exhaust gas is increased in contact efficiency with metallic mercury, by which the metallic mercury undergoes a highly efficient oxidation reaction.

As shown in FIG. 2(a) which is a side elevational view of the bag filter and FIG. 2(b) which is an enlarged view of the surface thereof, there is secured sufficient time (retention time) for adsorbing dust from the time when metallic mercury in exhaust gas is oxidized by an oxidation catalyst carried at a projected portion 1a on the surface of the filter cloth of the bag filter 1 and converted to mercury chloride up to the time when metallic mercury compounds 2 such as the thus obtained particulate mercury chloride are collected together with the dust adsorbed down to a relatively inner part of the filter cloth and dislodged from the filter cloth thereafter. The present invention has revealed that the above fact is quite effective in removing the metallic mercury compounds 2 which are oxidation products.

Thus, even in a case of the process (b) where the semidry desulfurization unit (8b) must be disposed on the upstream of the bag filter, it is possible to remove mercury chloride effectively by the oxidation catalyst carried on the bag filter.

As described above, according to the present invention, even in the process (a) or the process (b), it is possible to oxidize effectively metallic mercury and recover the thus obtained mercury chloride at a high removal rate.

Conventionally, mercury oxidation products in dust must be recovered and removed by a desulfurization unit after metallic mercury is oxidized to mercury chloride or others. Thereby, the step of desulfurization must be provided in a subsequent step of oxidation of metallic mercury. However, according to the present invention, even in an exhaust-gas treating system which uses coal as a fuel to require the semidry desulfurization unit (8b) (mercury chloride, that is, an oxidation product of metallic mercury, is recovered at a relatively lower rate than when the wet desulfurization unit (8a) is used), a bag filter carrying an oxidation catalyst for metallic mercury is disposed in a flow channel of exhaust gas on the downstream side of the semidry desulfurization unit (8b). Thus, it is possible to remove metallic mercury compositions from the exhaust gas at a high removal rate.

As described above, in a second aspect of the invention described above (the invention made up of the process (a)), oxidation products of metallic mercury generated in the denitration unit (5) and the bag filter on the upstream side are partially adsorbed and removed by the bag filter and further absorbed and removed by an absorbing liquid inside the wet desulfurization unit (8a) at a high efficiency.

Further, in accordance with a third aspect of the invention described above (the invention made up of the process (b)), a certain amount of oxidation products such as mercury chloride mainly by oxygen resulting from the oxidization of metallic mercury by the denitration unit (5) on the upstream side is removed by the semidry desulfurization. unit (8b). In addition, the oxidation of metallic mercury and the adsorption of oxidation products on dust collected by a filter cloth are carried out at the same time by a bag filter containing an oxidation catalyst disposed in a low temperature region, thus making it possible to remove the metallic mercury at a high efficiency.

In accordance with a fourth aspect of the invention, there is provided an apparatus for removing trace amounts of toxic substances from exhaust gas described in any aspect above in which a denitration catalyst of the denitration catalyst layer is made up of a first composition of two or more types of compounds selected from titanium oxide ($TiO_2$), silicon oxide ($SiO_2$) and aluminum oxide ($Al_2O_3$) and a second composition of two or more types of metals selected from molybdenum (Mo), vanadium (V) and tungsten (W) or the oxidation products thereof.

According to a fourth aspect of the invention, the denitration catalyst of the denitration catalyst layer is made up of a first composition of two or more types of compounds selected from $TiO_2$, $SiO_2$ and $Al_2O_3$ and a second composition of two or more types of metals selected from Mo, V and W or the oxidation products thereof. The first composition has the function as a carrier of catalysts, while the second composition has the function to effect the denitration reaction and the oxidization of metallic mercury. However, the actions of the first composition and the second composition are considered not to be simple. On the contrary, these actions are considered to be complicated by the first composition and the second composition.

According to a further aspect of the invention described above, conversion of Hg to $HgCl_2$, $HgO_2$ and others is facilitated by a denitration catalyst due to HCl, oxygen and others contained in exhaust gas. Further, the thus obtained $HgCl_2$ and others are adsorbed on the surface of dust by the dust removal unit and also made easily absorbed by an absorbent such as lime slurry in the desulfurization unit.

Incidentally, the denitration catalyst layer of the denitration unit (5) having functions capable of oxidizing metallic mercury disposed for treating exhaust gas from the combustion equipment (4) such as a boiler is in general divided into a plurality of denitration catalyst layers for attaining a target denitration rate and disposed in a plurality of stages in a gas flowing direction. $NH_3$ is supplied in an amount corresponding to a required denitration performance, thereby effecting the denitration of exhaust gas. $NH_3$ supplied into the exhaust gas is adsorbed on an active site on the surface of the denitration catalyst to react with NOx in the exhaust gas and decomposed into harmless nitrogen ($N_2$). The $NH_3$ is adsorbed on the active site of the denitration catalyst, by which metallic mercury (Hg) is suppressed from being adsorbed at the active site of the denitration catalyst. Therefore, metallic mercury is decreased in oxidation reaction speed.

Therefore, plural stages of denitration catalyst layers are disposed in a gas flowing direction inside the denitration unit (5). In some of the denitration catalyst layers on the relatively upstream side among them, $NH_3$ supplied into exhaust gas is present at high concentrations. Thus, these layers are relatively ineffective in allowing the oxidation reaction of Hg to proceed, and Hg is finally effectively oxidized in a region close to the denitration catalyst layer on the relatively downstream side at which $NH_3$ is consumed by denitration reaction. Where the concentration of HCl in the exhaust gas is low, the oxidation reaction of Hg is further decreased in reaction speed. It may be better to consider that the denitration catalyst layer on the upstream side in which the concentration of $NH_3$ inside the denitration catalyst layer is high may hardly contribute to the oxidation reaction of Hg.

Therefore, an amount of the denitration catalyst necessary for obtaining a desired denitration performance may often result in a case where the oxidation of Hg is not sufficiently carried out. Further, since exhaust gas resulting from the combustion of petroleum or coal may abundantly contain alkali, alkali earth metals, arsenic (As) compounds and phosphorous (P) compounds and others as catalyst poisons, the denitration catalyst is deteriorated when used over a prolonged period of time. In this instance, an amount of $NH_3$ adsorbed by the denitration catalyst is greatly decreased due to the poisoning compositions adsorbed on the surface of the catalyst, and $NH_3$ is supplied therefrom at a high concentration also to the denitration catalyst layer on the downstream side. As a result, there is caused a greater decrease in oxidation speed of Hg. Where the concentration of HCl in exhaust gas is low, the oxidation speed of Hg is markedly decreased.

Meanwhile, as described above, in order that the denitration catalyst is used to oxidize metallic mercury (Hg) at a low temperature in the presence of HCl to generate $HgCl_2$, the concentration of Hg to be oxidized is quite low. Thus, the use of an ordinary solid denitration catalyst will require ingenuity so that the low concentration of HCl is in contact with the low concentration of metallic mercury at an increased rate. Further, the reaction of sulfur oxides (SOx) present in exhaust gas with $NH_3$ leaked from the denitration catalyst on the upstream side is responsible for generating acid ammonium sulfate ($NH_4HSO_4$), thus resulting in a great decrease in oxidation capacity of the denitration catalyst. Under the above circumstances, ingenuity is required for suppressing the deposition of acid ammonium sulfate as much as possible.

Further, exhaust gas emitted from combustion equipment which uses petroleum or coal as a fuel contains a relatively high concentration of dust. Therefore, where a solid denitration catalyst layer is disposed inside a flow channel of exhaust gas after removal of the dust, it is necessary to dispose plural stages of denitration catalyst layers at a certain interval (an inter-catalyst opening; pitch). An increase in pitch between adjacent catalyst layers becomes a factor for a decrease in speed at which a trace composition of metallic mercury is dispersed and adsorbed on the surface of the catalyst. Therefore, it is desirable to set a denitration catalyst layer in which the pitch between the catalyst layers is designed so as to be made as small as possible. However, in this instance, the gas flow channel is blocked inside the catalyst layer resulting from dust or an increase in the loss of pressure which is not negligible is caused, thereby the efficiency of generating electricity at a power plant is reduced. Further, there may be a case where the concentration of HCl necessary for the oxidation reaction of metallic mercury is decreased depending on the type of a fuel to be used. In this instance, it is necessary to raise the contact efficiency of the low concentration of HCl with the low concentration of metallic mercury.

The invention described in claim 5 of the present invention has been made in view of the above situation. The invention described in claim 5 is the apparatus for removing trace amounts of toxic substances from exhaust gas described in any one of claim 1 to claim 4 in which the concentration of the second composition of the denitration catalyst on the denitration catalyst layer on the relatively downstream side among plural stages of denitration catalyst layers disposed inside the denitration unit in a gas flowing direction is made lower in a stepwise manner than that of the second composition of the denitration catalyst on the denitration catalyst layer on the relatively upstream side.

In order to maintain a desired denitration performance, as shown in FIG. 5, the exhaust gas denitration unit is normally provided with plural stages of denitration catalyst layers 3 in a gas flowing direction (denitration catalyst layers 3a, 3b and others given in FIG. 5). According to the invention described in claim 5, it is characterized that the second composition of the denitration catalyst is carried at a high concentration in a disintegrated manner on a denitration catalyst layer at the relatively upstream stage side (for example, the denitration catalyst layer 3a) among plural stages of denitration catalyst layers disposed in a gas flowing direction. In this instance, nitrogen oxides are subjected to denitration efficiently on the denitration catalyst layers carrying the high concentration of the second composition at the relatively upstream stage side. As a result, $NH_3$ supplied into exhaust gas is mostly consumed on the denitration catalyst layers at the relatively upstream stage. It is, thereby, possible to oxidize efficiently metallic mercury in the exhaust gas on a denitration catalyst layer at the relatively downstream stage side (for example, the denitration catalyst layer 3b). In this instance, denitration catalysts on individual catalyst layers are planned for the denitration performance so as to obtain a satisfactory denitration rate on the denitration catalyst layers 3 as a whole.

Further, exhaust gas resulting from the combustion of petroleum or coal abundantly contains sulfur oxides (SOx) therein, thus making it necessary to suppress the oxidation of $SO_2$. Since the denitration catalyst layer at the relatively lower downstream stage side is low in the amount of carrying the second composition with the oxidative activity, it is possible to suppress the oxidation rate of $SO_2$ as denitration catalysts as a whole.

This is based on the following mechanism. That is, the oxidation of $SO_2$ is expressed by the chemical formula (2) given below and in an equilibrium relationship with the concentration of $SO_3$ in exhaust gas. Therefore, if the oxidation reaction of $SO_2$ proceeds on a denitration catalyst layer rich in the second composition of the denitration catalyst at the relatively upstream stage side, the concentration of $SO_3$ is increased on a denitration catalyst layer on the relatively downstream side. Then, the oxidation reaction of $SO_2$ is less likely to take place due to a chemical equilibrium, acting to suppress the oxidation of $SO_2$ as catalysts as a whole.

$$SO_2 + 1/2 O_2 \rightarrow SO_3 \qquad (2)$$

According to the invention described in claim 5, the second composition with oxidative activity carried at a relatively high concentration in a disintegrated manner on a denitration catalyst layer at the relatively upstream stage side among plural stages of denitration catalyst layers in a gas flowing direction, which are plural stages of denitration catalyst layers disposed in a gas flowing direction, is able to effect an efficient denitration of exhaust gas in the presence of ammonia. Further, the second composition carried at a relatively low concentration in a disintegrated manner on the denitration catalyst layer at the relatively downstream stage side is able to oxidize efficiently metallic mercury in the exhaust gas on a denitration catalyst layer on the downstream side in which the concentration of ammonia for inhibiting the oxidation reaction is lower than at the upstream stage side. Further, the above-described denitration catalyst layer at the relatively downstream stage side is low in concentration of carrying the second composition with the oxidative activity, thus making it possible to suppress the oxidation rate of $SO_2$ as denitration catalysts as a whole and also suppress the concentration of $SO_3$ in the exhaust gas to a lower level.

In accordance with a sixth aspect, the invention provides an apparatus for removing trace amounts of toxic substances from exhaust gas 20 described in any one of claim 1 to claim 5 in which an oxidation catalyst for metallic mercury used in a bag filter of the dust removal unit (7) is made up of metals such as titanium (Ti), molybdenum (Mo) and vanadium (V) or the oxidation products thereof.

Even if a denitration catalyst which contains an oxidation catalyst is arranged in a temperature range (300 to 400° C.) at which the denitration catalyst layer of the denitration unit (5) is normally disposed to convert metallic mercury to mercury chloride, it is difficult to oxidize metallic mercury at a high temperature and in particular at a low concentration of HCl in exhaust gas.

Therefore, the air preheater (6), which is one constituent of an exhaust gas clarification system, is installed together with a bag filter carrying the oxidation catalyst in exhaust gas in a low temperature region after heat exchange, thus making it possible to oxidize metallic mercury in exhaust gas, with the exhaust gas kept lowered in temperature.

According to a sixth aspect of the invention, the oxidation catalyst for metallic mercury used in the bag filter of the dust removal unit (7) is made up of metals such as Ti, Mo, and V or the oxidation products thereof. Further, metals or the oxidation products thereof substantially similar to the denitration catalyst compositions may be used as an oxidation catalyst for metallic mercury as they are.

According to the invention described in claim 6, the oxidation catalyst in the bag filter of the dust removal unit (7) is used to oxidize metallic mercury remaining in exhaust gas. Thus, it is possible to collect mercury oxidation products such as the thus obtained mercury chloride by the bag filter.

In accordance with a seventh aspect, the invention provides an apparatus for removing trace amounts of toxic substances from exhaust gas described in any one of the foregoing aspects in which an amount of the oxidation catalyst for metallic mercury used in the bag filter of the dust removal unit (7) to be carried on a filter cloth is an amount of the oxidation catalyst in the denitration catalyst used in the denitration unit (5) or more, with the usage range from 100 to 500 g/m².

According to a seventh aspect of the invention, the concentration of the oxidation catalyst in the bag filter of the dust removal unit (7) disposed in a flow channel of exhaust gas on the downstream side from the denitration catalyst layer of the denitration unit (5) can be made higher than that of the second composition, which is the same composition of the denitration catalyst layer of the denitration unit (5). This is due to the fact that the reaction oxidation of $SO_2$ to SO3 resulted in an oxidation catalyst temperature range in the bag filter is least likely to take place at low temperatures.

The bag filter which carries the oxidation catalyst has a cross section structure as shown in FIG. 2, which is a structure in which exhaust gas can sneak through a clearance between the fiber of the bag filter 1 and a catalyst carried by the fiber. The structure is that in which the movement of substances is facilitated. As described previously, metallic mercury in exhaust gas is present in a very trace amount. In particular, where the concentration of HCl in the exhaust gas is low, it is necessary to raise the contact efficiency of metallic mercury with HCl so that they are allowed to react effectively on the oxidation catalyst in the bag filter. However, as described above, the fiber of non-woven cloth disrupts the gas flow to increase the speed of movement of the substances and therefore is suitable in raising the contact efficiency of metallic mercury with HCl. Further, in order to suppress the pressure loss, the bag filter 1 is normally designed to be 1 m/min or lower in passage speed of the filter cloth, thereby securing a sufficient time during which metallic mercury is in contact with HCl inside the bag filter 1.

Any filter cloth is acceptable as a filter cloth used in the bag filter 1 including functions capable of acting as the oxidation catalyst, as long as it is a material usable in treating exhaust gas resulting from the combustion of petroleum or coal. The material may include, for example, polyimide, polyamide, polyphenylene sulfide, polytetrafluoroethylene and glass fiber. A usage amount of the oxidation catalyst carried on and used in the filter cloth is from 100 g/m² to 500 g/m² per area of the filter cloth and preferably from 200 to 400 g/m². As shown in FIG. 4, this is due to the fact that where an excessively small amount of the oxidation catalyst cannot provide a sufficient catalyst effect, while an excessively great usage amount thereof can increase the pressure loss of a system and fail in sufficiently dislodging dust on regeneration of the filter cloth after treatment of exhaust gas.

According to a seventh aspect of the invention, the concentration of the oxidation catalyst of the bag filter carrying the oxidation catalyst is made higher than that of the second composition with oxidative activity on the denitration catalyst layer of the denitration unit (5), thus making it possible to suppress the oxidation of $SO_2$ in exhaust gas to $SO_3$ on the denitration catalyst layer. On the other hand, the oxidation catalyst is located in a lower temperature region on the bag filter than the denitration catalyst layer of the denitration unit (5). The oxidation reaction of $SO_2$ to $SO_3$, is less likely to take place, thus there is no fear that $SO_2$ is oxidized to give $SO_3$ and even a trace amount of metallic mercury can be oxidized by a sufficient amount of the oxidation catalyst.

An amount of the oxidation catalyst for metallic mercury to be carried in the filter cloth which is used in the bag filter of the dust removal unit (7) is to be in a range of 100 to 500 g/m², thereby providing a sufficient catalyst effect, keeping the pressure loss on passage of exhaust gas through the bag filter to a reasonable level, and effecting the oxidation of metallic mercury without affecting the dust dislodging effect.

In accordance with an eighth aspect of the invention, there is provided a method of operating the apparatus for removing trace amounts of toxic substances from exhaust gas described in any of the foregoing aspects in which the denitration unit (5) is operated at a temperature of 250° C. to 450° C. and the bag filter containing the oxidation catalyst for metallic mercury of the dust removal unit is operated at a temperature of 120° C. to 250° C.

According to the invention described in claim 8, the denitration reaction is facilitated at 250° C. to 450° C. at which the denitration catalyst is active, thus making it possible to oxidize metallic mercury at 120° C. to 250° C. at which the oxidation catalyst is active.

Even if a denitration catalyst carrying an oxidation catalyst is arranged in a temperature range (300 to 400° C.) at which the denitration catalyst is normally disposed to convert metallic mercury to mercury chloride, it is difficult to oxidize metallic mercury at a high temperature and in particular at a low concentration of HCl in exhaust gas.

Thus, the air preheater (6), which is one constituent of an exhaust gas clarification system, is installed together with a bag filter carrying the oxidation catalyst in exhaust gas in a low temperature region after heat exchange, thus making it possible to oxidize metallic mercury in exhaust gas, with the exhaust gas kept lowered in temperature.

In accordance with an eighth aspect of the invention described above, it is possible to effect the denitration of exhaust gas and the oxidation of metallic mercury respectively in a temperature range at which the denitration catalyst is active and at a temperature in which the oxidation catalyst is active.

It is noted that the denitration catalyst used in the present invention can be provided with the same effect not only in a plate shape but also in a honey-comb shape, to which the present invention shall not be limited.

BEST MODE FOR CARRYING OUT THE INVENTION

Hereinafter, a description will be given for examples of the present invention.

Exhaust gas emitted from a boiler will be treated in accordance with the flow diagrams given in FIG. 1(*a*) and FIG. 1(*b*) in the following examples of the present invention.

Figure 1:
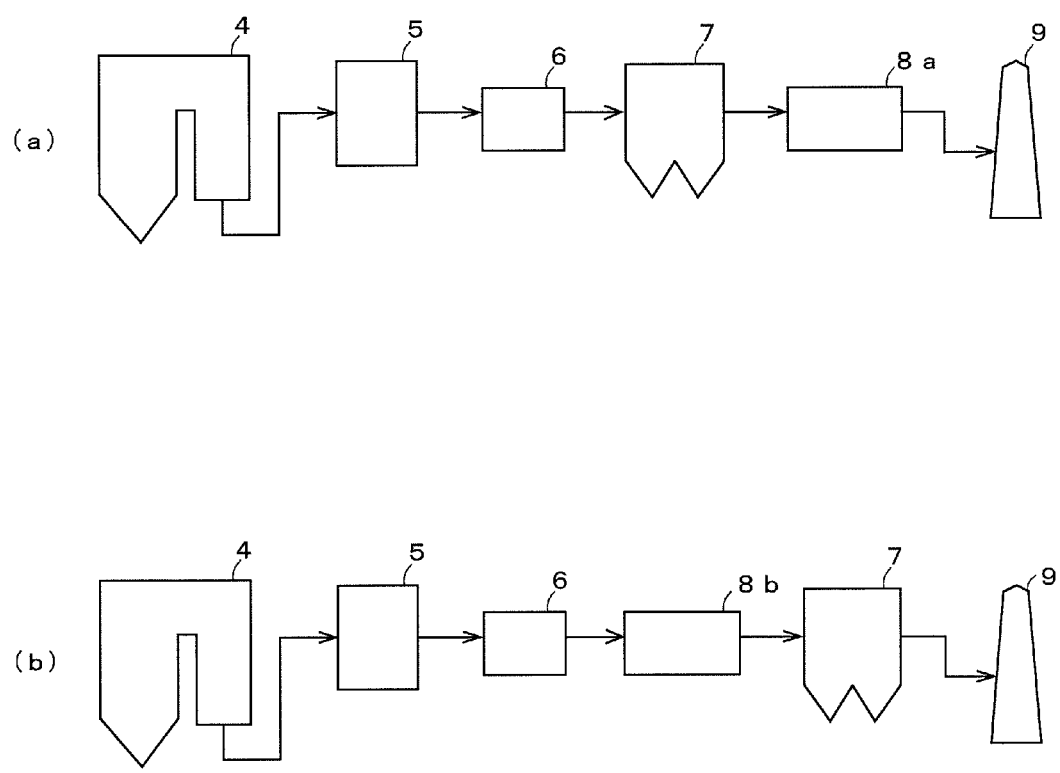
FIG. 1 is flow diagrams showing an exhaust gas treating system of an example of the present invention.
Figure 2:
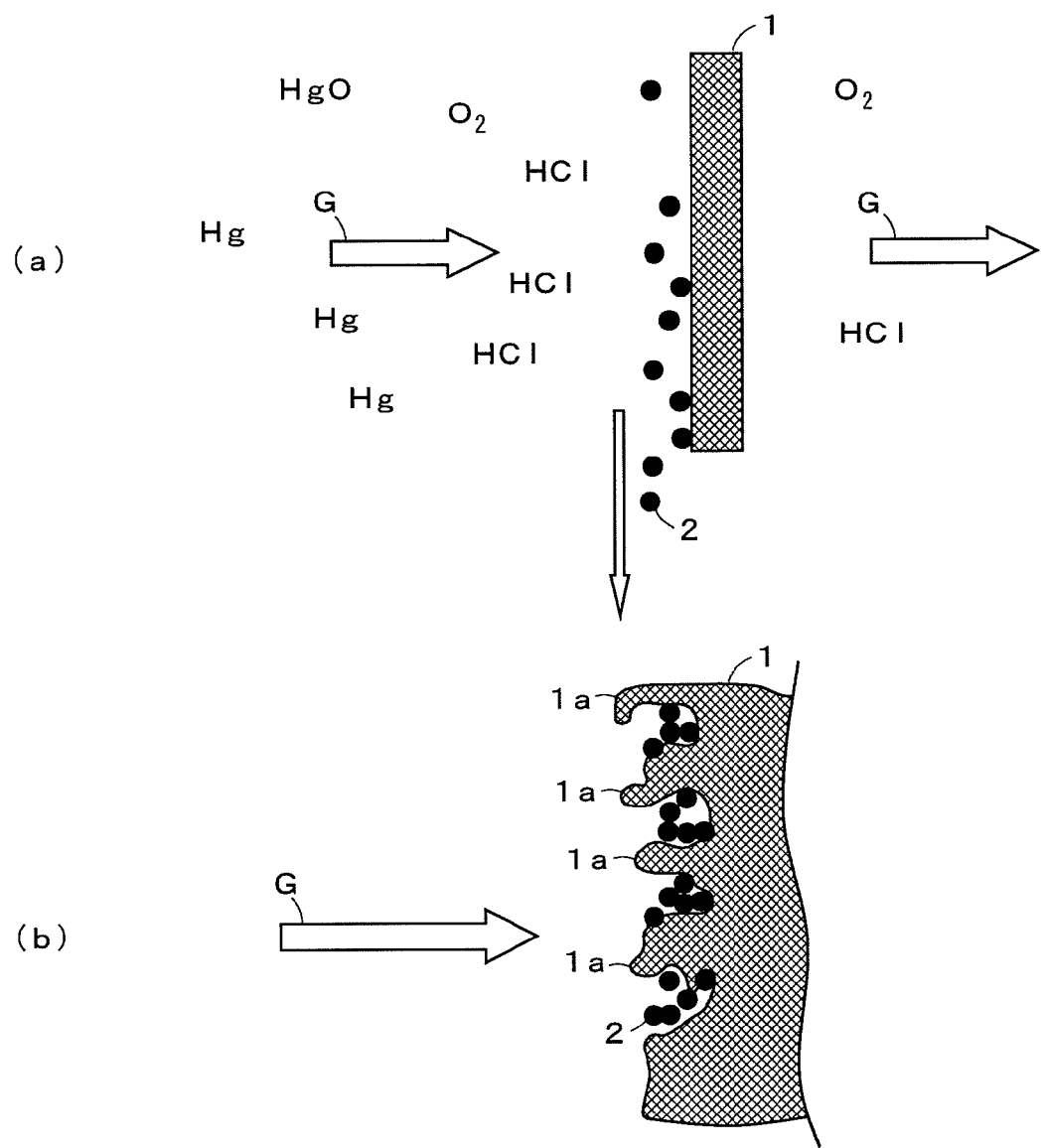
FIG. 2 is views showing major structures of a bag filter carrying an oxidation catalyst.
Figure 3:
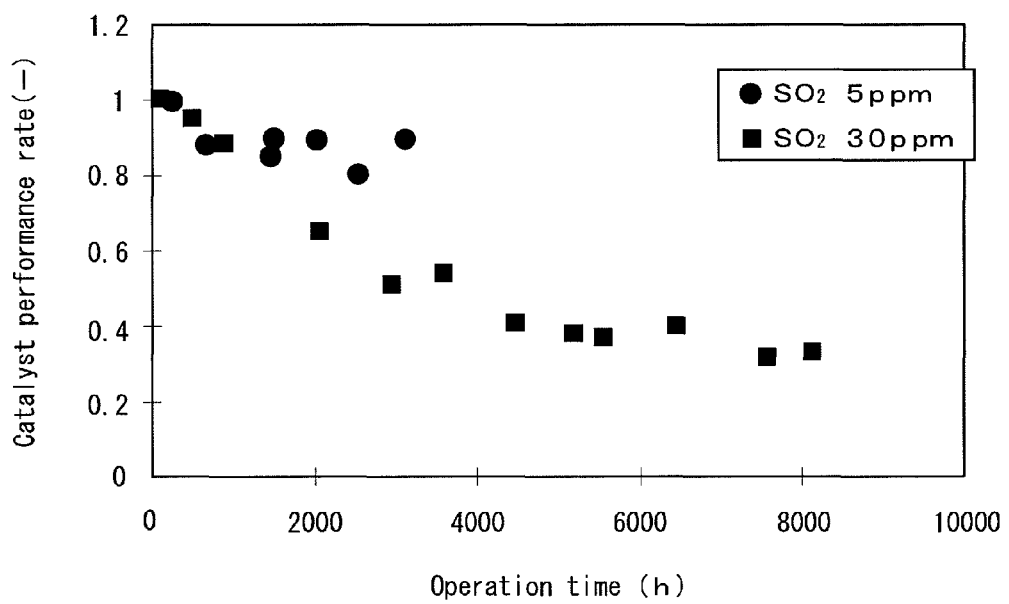
FIG. 3 shows change in functions of a denitration catalyst in the coexistence of SOx at low temperatures.
Figure 4:
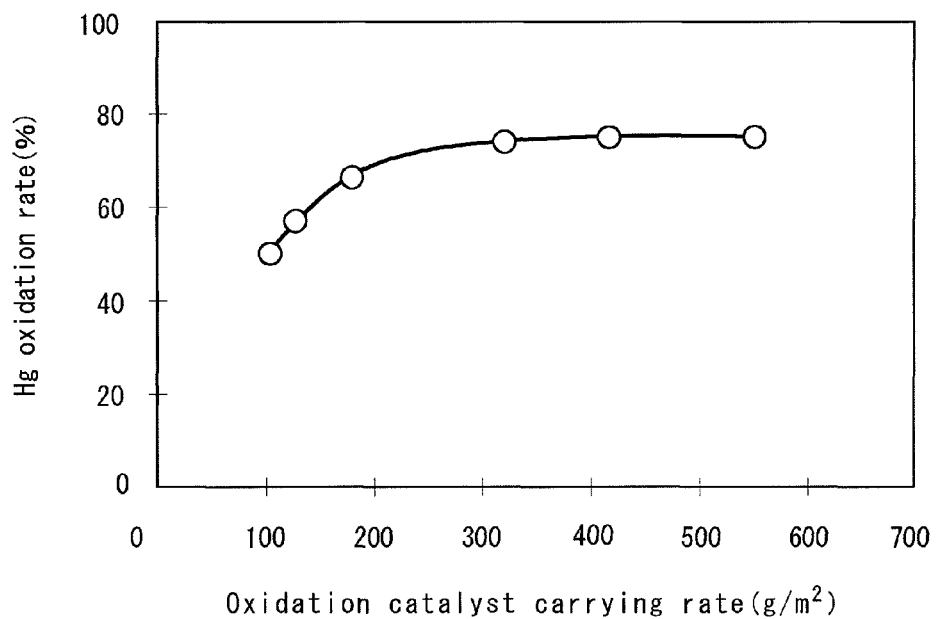
FIG. 4 shows a correlation between the denitration catalyst carrying amount and functions of the catalyst.
Figure 5:
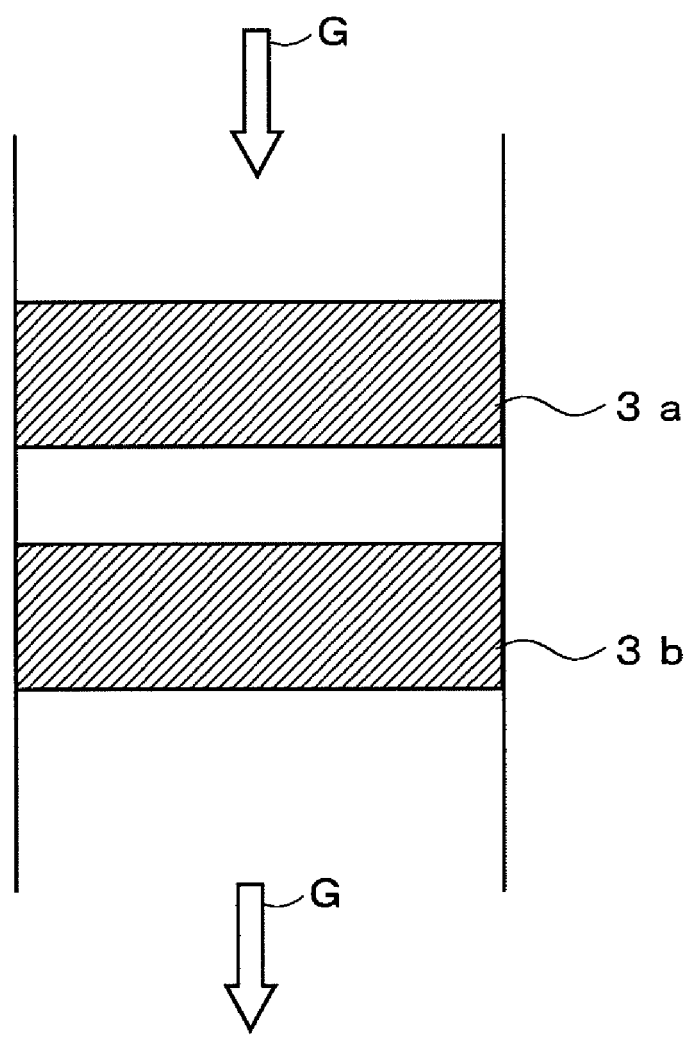
FIG. 5 shows a structure at which a catalyst layer is disposed in a denitration unit.

As shown in the flow diagram of FIG. 1(*a*), there are disposed in sequence from the upstream side in a flow channel of exhaust gas emitted from a boiler 4 for burning petroleum or coal a denitration unit 5 including a denitration catalyst layer having functions capable of removing nitrogen oxides from the exhaust gas in the presence of ammonia and also capable of oxidizing metallic mercury; an air preheater 6 adapted for heat exchange between air for combustion in the combustion equipment and the exhaust gas; a dust removal unit 7 having a bag filter containing an oxidation catalyst for metallic mercury; a desulfurization unit 8 for removing sulfur oxides from the exhaust gas by using an absorbent such as limestone slurry; and a smokestack 9 for emitting the thus clarified exhaust gas into the atmosphere.

Further, as shown in the flow diagram of FIG. 1(*b*), there are disposed in sequence from the upstream side a denitration unit 5 including a denitration catalyst layer having functions capable of removing nitrogen oxides from the exhaust gas in the presence of ammonia and capable of oxidizing metallic mercury; an air preheater 6 adapted for heat exchange between air for combustion in the combustion equipment and the exhaust gas; a semidry desulfurization unit 8*b* for directly spraying an absorbent such as limestone into the exhaust gas to remove SOx from the exhaust gas; a dust removal unit 7 having a bag filter containing an oxidation catalyst for metallic mercury; and a smokestack 9 for emitting the thus clarified exhaust gas into the atmosphere.

EXAMPLE 1

As an oxidation catalyst for metallic mercury to be carried on a bag filter, ammonium molybdate $((NH_4)_6.Mo_7O_{24}.4H_2O)$, 10.7 kg, ammonium metavanadate $(NH_4VO_3)$, 9.9 kg, and oxalic acid, 12.8 kg, were added to titanium oxide powder ($TiO_2$ content: 90 wt % or more, $SO_4$ content: 3 wt % or less), 85 kg, the resultant was in sequence subjected to kneading, granulation, drying, and calcination, with the water content adjusted, and the thus obtained powder was crushed into appropriately-sized particles to obtain a raw material powder for the catalyst. Water was added to the raw material powder to obtain a catalyst slurry. A Tefaire-made filter cloth was submerged into the catalyst slurry, and after catalyst compositions were carried and treated, the filter cloth was dried at 150° C. to obtain a bag filter carrying an oxidation catalyst for metallic mercury. The bag filter carrying the catalyst was in an amount of 350 g/m².

Further, as a first composition of the denitration catalyst, used were titanium oxide powder ($TiO_2$ content: 90 wt % or more, $SO_4$ content: 3 wt % or less), 70 kg, aluminum compound powder ($Al_2O_3$) and silica sol ($SiO_2$), 70 kg. As a second composition, molybdenum trioxide ($MoO_3$), 7 kg, and ammonium metavanadate ($NH_4VO_3$), 1.6 kg, were added and alumina/silicate fiber was also added. Thereafter, the resultant was kneaded, with the water content adjusted. The thus obtained catalyst paste was applied on an expanded metal and pressed into a predetermined shape to obtain a plate-shape denitration catalyst. The plate-shape catalyst was calcinated at 500° C.

A catalyst layer containing the above-described denitration catalyst was disposed on coal-fired boiler test equipment, and an air preheater for decreasing the temperature of exhaust gas and a bag filter carrying the oxidation catalyst were disposed in sequence on the downstream side. Further, a wet desulfurization unit (limestone/gypsum process) was disposed on the downstream thereof.

EXAMPLE 2

As with Example 1, a bag filter carrying an oxidation catalyst for metallic mercury was prepared. Further, as a first composition of the denitration catalyst, titanium oxide powder ($TiO_2$ content: 90 wt % or more, $SO_4$ content: 3 wt % or less), 70 kg, and aluminum compound powder ($Al_2O_3$), 0.9 kg, were used. As a second composition, molybdenum trioxide ($MoO_3$), 7 kg, and ammonium metavanadate ($NH_4VO_3$), 1.6 kg were added, and alumina/silicate fiber was also added. Thereafter, the resultant was kneaded, with the water content adjusted. The thus obtained catalyst paste was applied on an expanded metal and pressed into a predetermined shape to obtain a plate-shape denitration catalyst. The plate-shape catalyst was calcinated at 500° C.

A catalyst layer containing the above-described denitration catalyst was disposed on coal-fired boiler test equipment, and an air preheater and a bag filter carrying the oxidation catalyst were disposed in sequence on the downstream side. Further, a wet desulfurization unit (limestone/gypsum process) was disposed on the downstream side thereof.

EXAMPLE 3

As with Example 1, a bag filter carrying an oxidation catalyst for metallic mercury was prepared. Further, as a first composition of the denitration catalyst, titanium oxide powder ($TiO_2$ content: 90 wt % or more, $SO_4$ content: 3 wt % or less), 70 kg, and aluminum compound powder ($Al_2O_3$), 0.9 kg, were used. As a second composition, ammonium metatungstate $(NH_4)_6[H_2W_{12}O_{40}]$, 20 kg, and ammonium metavanadate $(NH_4VO_3)$, 1.6 kg, were added, and alumina/silicate fiber was also added. Thereafter, the resultant was kneaded, with the water content adjusted. The thus obtained catalyst paste was applied on an expanded metal and pressed into a predetermined shape to obtain a plate-shape denitration catalyst. The plate-shape catalyst was calcinated at 500° C.

A catalyst layer containing the above-described denitration catalyst was disposed on coal-fired boiler test equipment, and an air preheater and a bag filter carrying the oxidation catalyst were disposed in sequence on the downstream side. Further, a wet desulfurization unit (limestone/gypsum process) was disposed on the downstream side thereof.

EXAMPLE 4

As with Example 1, prepared was a bag filter carrying the denitration catalyst and the oxidation catalyst. The bag filter carrying the catalyst was in an amount of 76 g/m². The test equipment was disposed in the same manner as that of Example 1.

EXAMPLE 5

Molybdenum trioxide ($MoO_3$), 7 kg, ammonium metavanadate ($NH_4VO_3$), 3.2 kg, and aluminum compound powder ($Al_2O_3$), 0.9 kg, as a second composition were added to titanium oxide powder ($TiO_2$ content: 90 wt % or more, $SO_4$ content: 3 wt % or less), 70 kg, as a first composition of the denitration catalyst. Alumina/silicate fiber and silica sol ($SiO_2$), 14 kg, were added. Thereafter, the resultant was kneaded, with the water content adjusted. The thus obtained catalyst paste was applied on an expanded metal and pressed into a predetermined shape to obtain a plate-shape denitration catalyst. The plate-shape catalyst was calcinated at 500° C.

The catalyst was used on the denitration catalyst layer at the relatively downstream stage and the denitration catalyst prepared in Example 1 was disposed on the denitration catalyst layer at the relatively upstream stage side to give a denitration unit, thereby disposing the test equipment described in Example 1. It is noted that the bag filter carrying the denitration catalyst and the oxidation catalyst in this instance was the same as that of Example 1.

EXAMPLE 6

The bag filter carrying the denitration catalyst and the oxidation catalyst used in Example 1 was used. And, the denitration catalyst and an air preheater were disposed in sequence on the similar test equipment in the same way. Further, a semidry desulfurization unit was disposed on the downstream part thereof. Thereafter, disposed was a bag filter carrying the catalyst.

EXAMPLE 7

The denitration catalyst layer used in Example 1 was not used. After a lowering in temperature by using an air preheater, a bag filter carrying the oxidation catalyst was disposed and a wet desulfurization unit was disposed on the downstream part thereof.

COMPARATIVE EXAMPLE 1

The test equipment was disposed in the same way as Example 1 to conduct an experiment by using the same oxidation catalyst as the oxidation catalyst carried on the bag filter of Example 1, except that the vanadium composition high in oxidative activity was decreased in content.

Specifically, as an oxidation catalyst for metallic mercury to be carried on a bag filter, ammonium molybdate (($NH_4$)$_6$.$Mo_7O_{24}$.$4H_2O$), 10.1 kg, ammonium metavanadate ($NH_4VO_3$), 2.0 kg, and oxalic acid, 2.6 kg were added to titanium oxide powder ($TiO_2$ content: 90 wt % or more, $SO_4$ content: 3 wt % or less), 85 kg. The resultant was subjected in sequence to kneading, granulation, drying, and calcination, with the water content adjusted, and the thus obtained powder was crushed into appropriately-sized particles to obtain a raw material powder for the catalyst. Water was added to the raw material powder to obtain a catalyst slurry. A Tefaire-made filter cloth was submerged into the catalyst slurry, and after catalyst compositions were carried and treated, the filter cloth was dried at 150° C. to obtain a bag filter carrying an oxidation catalyst for metallic mercury. The bag filter carrying the catalyst was in an amount of 350 g/m².

COMPARATIVE EXAMPLE 2

The denitration catalyst layer of Example 1 was disposed. Further, an ordinary bag filter free of functions of the oxidation catalyst was disposed and a wet desulfurization unit was disposed on the downstream part thereof. The test equipment was arranged in the same manner as that of Example 1.

It is noted that the ordinary bag filter used in this instance free of functions of the oxidation catalyst is a type such that in which glass fiber is used experimentally as a material of filter cloth and reverse washing is performed by a pulse jet process at the passage flow rate of 0.8 to 1.3 m/min.

Comparison was made for Hg removing performance in constitutions of Examples 1 to 7 and Comparative examples 1, 2 under the conditions given in Table 1 by using the above-described test equipment which has simulated a whole exhaust-gas clarification system. Obtained results were tabulated in Table 2. As apparent from Table 2, where catalysts are constituted according to the present invention to build a system, it is found that the Hg removing performance is excellent as a whole.

TABLE 1

| Reaction temperature | 300° C. |
| --- | --- |
| AV | approximately 15 m/h |
| Type of exhaust gas | Exhaust gas resulting from combustion of Black Thunder coal (Powder River Basin coal) |
| NO | approximately 50 ppm |
| $NH_3$/NO | 0.84 |
| $O_2$ | approximately 3% |
| HCl | approximately 10 ppm |
| Hg | approximately 10 μg/m³N |

TABLE 2

| Catalyst | Hg removal rate (%) |
| --- | --- |
| Example 1 | 90 |
| Example 2 | 92 |
| Example 3 | 89 |
| Example 4 | 86 |
| Example 5 | 93 |
| Example 6 | 83 |
| Example 7 | 75 |
| Comparative example 1 | 65 |
| Comparative example 2 | 60 |

INDUSTRIAL APPLICABILITY

The present invention is applicable to the treatment of exhaust gas emitted from a boiler etc., as an apparatus for removing in particular metallic mercury compounds as trace amounts of toxic substances contained in exhaust gas resulting from the combustion of petroleum or coal and a method of operating the same.

What is claimed is:

1. An apparatus for removing trace amounts of toxic substances from exhaust gas, wherein an air preheater adapted for heat exchange between air for combustion in combustion equipment and exhaust gas, and a dust removal unit having a bag filter provided with a filter cloth carrying an oxidation catalyst for metallic mercury, are disposed in sequence from an upstream side in a flow channel of exhaust gas emitted from combustion equipment for burning petroleum or coal,
wherein a denitration unit including a denitration catalyst layer having functions capable of removing nitrogen oxides from the exhaust gas and capable of oxidizing metallic mercury is disposed in a flow channel of exhaust gas on the upstream side of the air preheater, and a wet desulfurization unit for spraying an absorbent slurry into the flow channel of exhaust gas on a downstream side of the dust removal unit to remove sulfur oxides from the exhaust gas.

2. The apparatus for removing trace amounts of toxic substances from exhaust gas according to claim 1, wherein a denitration catalyst of the denitration catalyst layer is made up of a first composition of two or more types of compounds selected from titanium oxide ($TiO_2$), silicon oxide ($SiO_2$) and aluminum oxide ($Al_2O_3$) and a second composition of two or more types of metals selected from molybdenum (Mo), vanadium (V) and tungsten (W) or oxidation products thereof.

3. The apparatus for removing trace amounts of toxic substances from exhaust gas according to claim 1, wherein the concentration of the second composition of the denitration catalyst on the denitration catalyst layer on a relatively downstream side among plural stages of denitration catalyst layers disposed inside the denitration unit in a gas-flowing direction is made lower in a stepwise manner than that of the second composition of the denitration catalyst on the denitration catalyst layer on a relatively upstream side.

4. The apparatus for removing trace amounts of toxic substances from exhaust gas according to claim 1, wherein an oxidation catalyst for metallic mercury used in a bag filter of the dust removal unit is made up of metals such as titanium (Ti), molybdenum (Mo) and vanadium (V) or oxidation products thereof.

5. The apparatus for removing trace amounts of toxic substances from exhaust gas according to claim 1, wherein an amount of the oxidation catalyst for metallic mercury used in the bag filter of the dust removal unit to be carried on a filter cloth is an amount of the oxidation catalyst in the denitration catalyst used in the denitration unit or more, with the usage range from 100 to 500 $g/m^2$.

6. A method of operating the apparatus for removing trace amounts of toxic substances from exhaust gas according to claim 1, wherein the denitration unit is operated at a temperature of 250° C. to 450° C. and the bag filter containing the oxidation catalyst for metallic mercury of the dust removal unit is operated at a temperature of 120° C. to 250° C.

7. An apparatus for removing trace amounts of toxic substances from exhaust gas, wherein an air preheater adapted for heat exchange between air for combustion in combustion equipment and exhaust gas, and a dust removal unit having a bag filter provided with a filter cloth carrying an oxidation catalyst for metallic mercury, are disposed in sequence from an upstream side in a flow channel of exhaust gas emitted from combustion equipment for burning petroleum or coal,
wherein a denitration unit including a denitration catalyst layer having functions capable of removing nitrogen oxides from the exhaust gas and capable of oxidizing metallic mercury is disposed in a flow channel of exhaust gas on the upstream side of the air preheater, and a semidry desulfurization unit for spraying an absorbent slurry into the flow channel of exhaust gas to remove sulfur oxides from the exhaust gas is disposed in the flow channel of exhaust gas between the air preheater and the dust removal unit.

8. The apparatus for removing trace amounts of toxic substances from exhaust gas according to claim 7, wherein a denitration catalyst of the denitration catalyst layer is made up of a first composition of two or more types of compounds selected from titanium oxide ($TiO_2$), silicon oxide ($SiO_2$) and aluminum oxide ($Al_2O_3$) and a second composition of two or more types of metals selected from molybdenum (Mo), vanadium (V) and tungsten (W) or the oxidation products thereof.

9. The apparatus for removing trace amounts of toxic substances from exhaust gas according to claim 7, wherein the concentration of the second composition of the denitration catalyst on the denitration catalyst layer on a relatively downstream side among plural stages of denitration catalyst layers disposed inside the denitration unit in a gas flowing direction is made lower in a stepwise manner than that of the second composition of the denitration catalyst on the denitration catalyst layer on the relatively upstream side.

10. The apparatus for removing trace amounts of toxic substances from exhaust gas according to claim 7, wherein an oxidation catalyst for metallic mercury used in a bag filter of the dust removal unit is made up of metals such as titanium (Ti), molybdenum (Mo) and vanadium (V) or the oxidation products thereof.

11. The apparatus for removing trace amounts of toxic substances from exhaust gas according to claim 7, wherein an amount of the oxidation catalyst for metallic mercury used in the bag filter of the dust removal unit to be carried on a filter cloth is an amount of the oxidation catalyst in the denitration catalyst used in the denitration unit or more, with the usage range from 100 to 500 $g/m^2$.

12. A method of operating the apparatus for removing trace amounts of toxic substances from exhaust gas according to claim 7, wherein the denitration unit is operated at a temperature of 250° C. to 450° C. and the bag filter containing the oxidation catalyst for metallic mercury of the dust removal unit is operated at a temperature of 120° C. to 250° C.

* * * * *